US 7,065,582 B1
Jun. 20, 2006

(12) United States Patent
Dwork et al.

(10) Patent No.: US 7,065,582 B1
(45) Date of Patent: Jun. 20, 2006

(54) AUTOMATIC GENERATION OF FLOW CONTROL FRAMES

(75) Inventors: Jeffrey Dwork, San Jose, CA (US); Robert Alan Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/482,327

(22) Filed: Jan. 14, 2000

Related U.S. Application Data

(60) Provisional application No. 60/171,300, filed on Dec. 21, 1999.

(51) Int. Cl.
G06F 15/16 (2006.01)
G06F 13/00 (2006.01)

(52) U.S. Cl. .................. 709/234; 709/250; 710/29; 710/52

(58) Field of Classification Search ................ 709/234, 709/232, 223–225, 237, 250; 710/57, 52, 710/29, 56; 370/235
See application file for complete search history.

(56) References Cited

U.S. PATENT DOCUMENTS

| | | | | | |
|---|---|---|---|---|---|
| 5,299,313 | A | * | 3/1994 | Petersen et al. | 709/234 |
| 5,781,801 | A | * | 7/1998 | Flanagan et al. | 710/56 |
| 5,822,300 | A | * | 10/1998 | Johnson et al. | 370/229 |
| 5,983,278 | A | * | 11/1999 | Chong et al. | 370/414 |
| 6,081,843 | A | * | 6/2000 | Kilkki et al. | 709/232 |
| 6,081,846 | A | * | 6/2000 | Hyder et al. | 709/250 |
| 6,167,029 | A | * | 12/2000 | Ramakrishnan | 370/235 |
| 6,170,022 | B1 | * | 1/2001 | Linville et al. | 710/29 |
| 6,185,438 | B1 | * | 2/2001 | Fox | 455/560 |
| 6,189,053 | B1 | * | 2/2001 | Yasue et al. | 710/52 |
| 6,192,422 | B1 | * | 2/2001 | Daines et al. | 710/29 |
| 6,212,582 | B1 | * | 4/2001 | Chong et al. | 370/414 |
| 6,219,728 | B1 | * | 4/2001 | Yin | 710/52 |
| 6,405,256 | B1 | * | 6/2002 | Lin et al. | 709/231 |
| 6,405,259 | B1 | * | 6/2002 | Cheston et al. | 709/245 |
| 6,412,032 | B1 | * | 6/2002 | Neet et al. | 710/52 |
| 6,452,943 | B1 | * | 9/2002 | Furuya | 370/468 |
| 6,549,960 | B1 | * | 4/2003 | Allison et al. | 710/29 |
| 6,570,848 | B1 | * | 5/2003 | Loughran et al. | 370/230.1 |
| 6,628,613 | B1 | * | 9/2003 | Joung et al. | 370/230 |

OTHER PUBLICATIONS

Microsoft Press Computer Dictionary Third Edition, 1997, p. 140.*

* cited by examiner

*Primary Examiner*—Dung Dinh

(57) ABSTRACT

An automatic flow control mechanism that supports two modes of automatic flow control is provided in a network interface. In the first flow control mode, the network interface periodically compares the number of available receive descriptors with low and high threshold values. When the number of available receive descriptors falls below the low threshold value, the network interface sends a PAUSE frame requesting the link partner to suspend its transmission (in a full-duplex mode), or enables the back pressure mechanism (in a half-duplex mode). In the second flow control mode, when the network interface detects that the number of available receive descriptors is less than the low threshold value, it transmits a PAUSE frame requesting the link partner to suspend its transmission for a time period corresponding to a preprogrammed pause value (in a full-duplex mode), or enables the back pressure mechanism, at least, for a time interval defined by a pause timer loaded with the preprogrammed pause value (in a half-duplex mode).

19 Claims, 3 Drawing Sheets

AUTOMATIC GENERATION OF FLOW CONTROL FRAMES

This patent application claims priority of U.S. provisional patent application No. 60/171,300 entitled "AUTOMATIC FLOW CONTROL IN NETWORK INTERFACE DEVICE", filed on Dec. 21, 1999.

FIELD OF THE INVENTION

The present invention relates to data communications, and more particularly, to a network interface device having an automatic flow control mechanism.

BACKGROUND ART

A flow control mechanism is provided in a data network for controlling the transfer of data between network devices so as to prevent loss of data when the receiving device is not able to accept new messages or characters. For example, the Ethernet protocol (IEEE Std. 802.3, Annex 31B) defines a mechanism that allows a Media Access Control (MAC) device operating in a full-duplex mode to request that its link partner stop transmitting for a specified period of time. In particular, the MAC device transmits a MAC control PAUSE frame that specifies the length of time for which the link partner should suspend its transmission. The IEEE standard does not specify when PAUSE frames should be transmitted.

When a MAC device operates in a half-duplex mode, flow control may be performed using a procedure referred to as "back pressure". This procedure enables a MAC device to force a collision with the transmitting device by transmitting a short frame fragment. The collision causes the transmitting device to suspend its transmission for a random amount of time.

To increase the efficiency of a data network, it would be desirable to provide a network controller with a mechanism for performing flow control automatically in accordance with the number of buffers available for storing received data.

DISCLOSURE OF THE INVENTION

The present invention offers a novel system for performing automatic flow control in a computer system that comprises a local bus, a host processor coupled to the local bus, a network interface for providing an interface between the local bus and a network medium, and a memory having receive buffers allocated for receiving data from the network medium.

The network interface includes an automatic flow control mechanism for automatically controlling a flow of data from the network medium based on availability of the receive buffers.

In accordance with one aspect of the invention, in a first flow control mode, the automatic flow control mechanism responds to a shortage of the receive buffers by automatically requesting a remote transmitter coupled to the network medium to suspend data transmission until a predetermined number of the receive buffers is available.

In accordance with another aspect of the invention, in a second flow control mode, the automatic flow control mechanism responds to a shortage of the receive buffers by automatically requesting the remote transmitter to suspend data transmission for a predetermined time.

The network interface of the present invention comprises a descriptor management unit that manages descriptors pointing to the receive buffers. The automatic flow control mechanism may detect availability of the receive buffers by monitoring the number of available descriptors pointing to the receive buffers available for receiving data from the network medium.

In the first flow control mode, the automatic flow control mechanism automatically requests the remote transmitter to suspend data transmission when the number of available descriptors falls below a first threshold value. When the number of available descriptors rises above a second threshold value, the automatic flow control mechanism enables the remote transmitter to resume data transmission. The second threshold value may be higher than the first threshold value.

In the second flow control mode, the automatic flow control mechanism automatically requests the remote transmitter to suspend data transmission when the number of available descriptors falls below a preprogrammed threshold value. The remote transmitter is enabled to resume data transmission after a preprogrammed time interval, if the number of available descriptors is not less than the preprogrammed threshold value.

To enable the automatic flow control mechanism to monitor the number of available receive descriptors, the network interface is configured to store the host processor's read pointer pointing to the next descriptor that should be processed by the host processor after the current receive buffer is read.

In accordance with a method of the present invention, the following steps are carried out to perform automatic flow control in a network interface between a data network and a computer system:

monitoring the number of receive descriptors pointing to buffers in the computer system available for receiving data from the network, and automatically requesting a remote station in the data network to suspend data transmission when the number of receive descriptors falls below a first preprogrammed threshold level.

The remote station may be enabled to resume data transmission when the number of receive descriptors rises above a second preprogrammed threshold level. Alternatively, the remote station may be enabled to resume data transmission after a preprogrammed time interval, if the number of receive descriptors is not less that the first preprogrammed threshold level.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, such as an Ethernet (IEEE 802.3) network.

Figure 1:
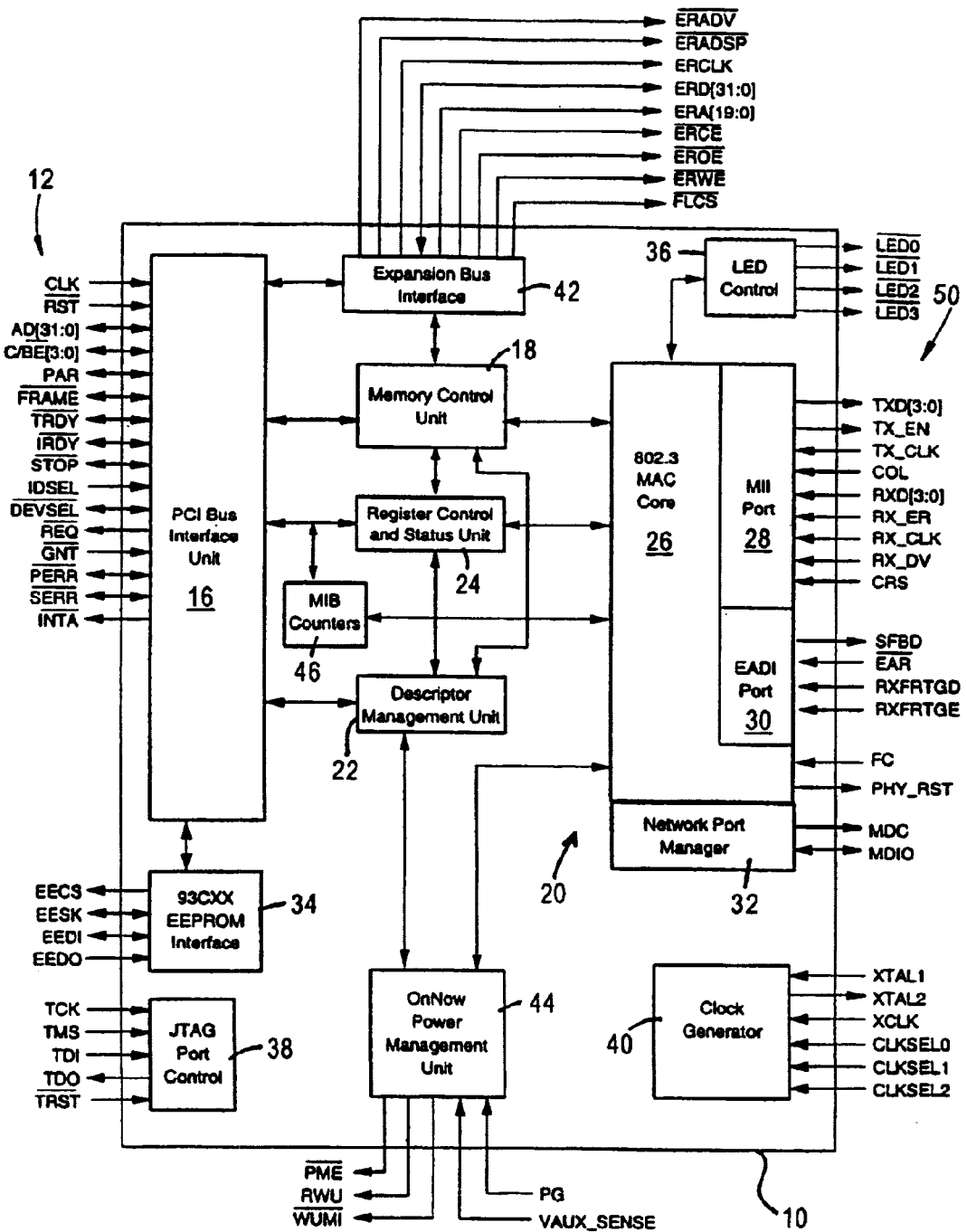
FIG. 1 is a block diagram of an exemplary network interface, in which the present invention may be implemented.

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer system, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media. The computer system is controlled by a host CPU coupled to the bus 12.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a computer system memory, e.g. a host CPU's memory, via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the system memory via the PCI bus interface unit 16. Data structures contained in the system memory specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
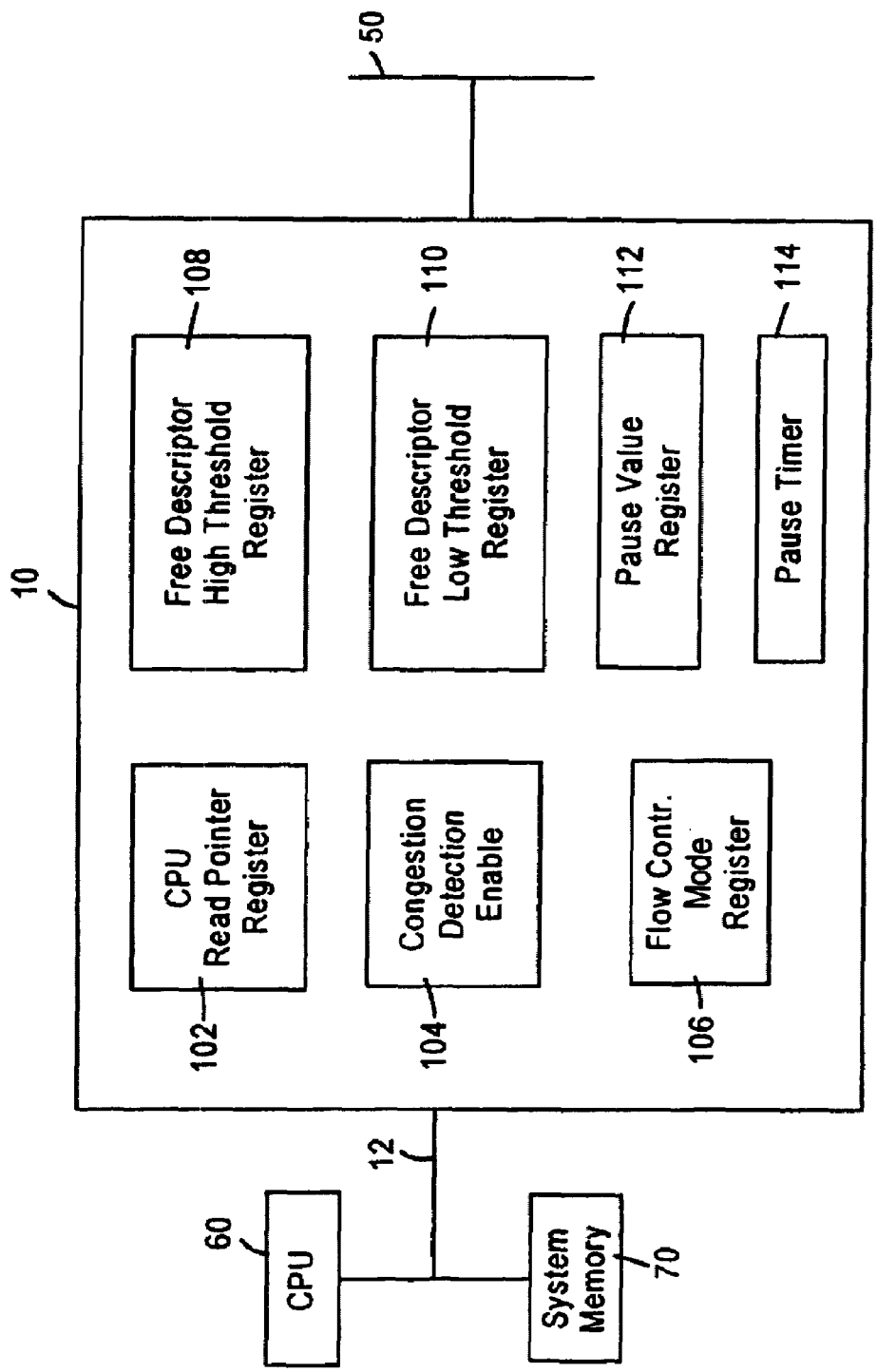
FIG. 2 is a block-diagram illustrating an automatic flow control mechanism in the network interface.

To control the reception of data from a link partner coupled to the network medium 50, the network interface 10 is provided with an automatic flow control mechanism schematically illustrated in FIG. 2. The automatic flow control mechanism comprises a CPU read pointer register 102 for storing a copy of a read pointer maintained by a host CPU 60 coupled to the network interface 10 via the bus 12. As will be described in more detail later, this read pointer indicates the next descriptor that the host CPU 60 should process after it reads the current reacive buffer.

Also, the automatic flow control mechanism of the present invention includes a congestion detection enable register 104, and a flow control mode register 106. The congestion detection enable register 104 contains a congestion detection enable bit that must be set to enable automatic generation of flow control frames. The flow control mode register 106 contains a flow control mode bit used to select one of two flow control modes provided in the network interface 10. In the first flow control mode, when the network interface 10 detects a shortage of buffers for holding received data, it automatically requests the link partner to suspend data transmission until the required number of receive buffers is available. In the second flow control mode, the network interface 10 automatically requests the link partner to suspend data transmission for a predetermined time.

Further, the automatic flow control mechanism comprises a free descriptor high threshold register 108 and a free descriptor low threshold register 110 for storing high and low programmable threshold values, respectively, used in the automatic flow control procedure, and a pause value register 112 and a pause timer 114, which are programmable registers used in the second flow control mode. For example, the registers of the automatic flow control mechanism may be arranged in the register control and status unit 24.

The automatic flow control mechanism of the present invention is based on calculating the number of available descriptors pointing to buffers allocated for storing received data. For example, the receive buffers may be arranged in the system memory 70. Descriptors that contain such information as the start address and length of the corresponding buffers may be maintained in selected structures of the system memory 70 having fixed addresses.

There are several different ways of organizing descriptors. For example, descriptors may be arranged in a linear list having a fixed beginning and a fixed or variable length. In a preferred embodiment of the present invention, the descriptors are organized in a descriptor ring, in which the first descriptor logically follows the last. The ring includes a suitable semaphore system that allows both the network interface 10 and the CPU 60 to determine at any particular time whether the contents of any particular descriptor are valid and whether it is allowed to alter contents of that descriptor.

As frames arrive from the network media 50, the network interface 10 copies frame data into the receive buffers in the order that the associated descriptors appear in the descriptor ring. Since the rate at which the CPU 60 can process data received from the network 50 differs from the rate at which a burst of data arrives from the network 50, some receive buffers may be filled with unprocessed data, while others are empty and are ready to receive new data.

The network interface 10 maintains a write pointer that points to the first descriptor in the ring that can be used for writing received frame data. The host CPU 60 maintains a read pointer that points to the next descriptor that the CPU 60 should process after reading the current receive buffer.

Figure 3:
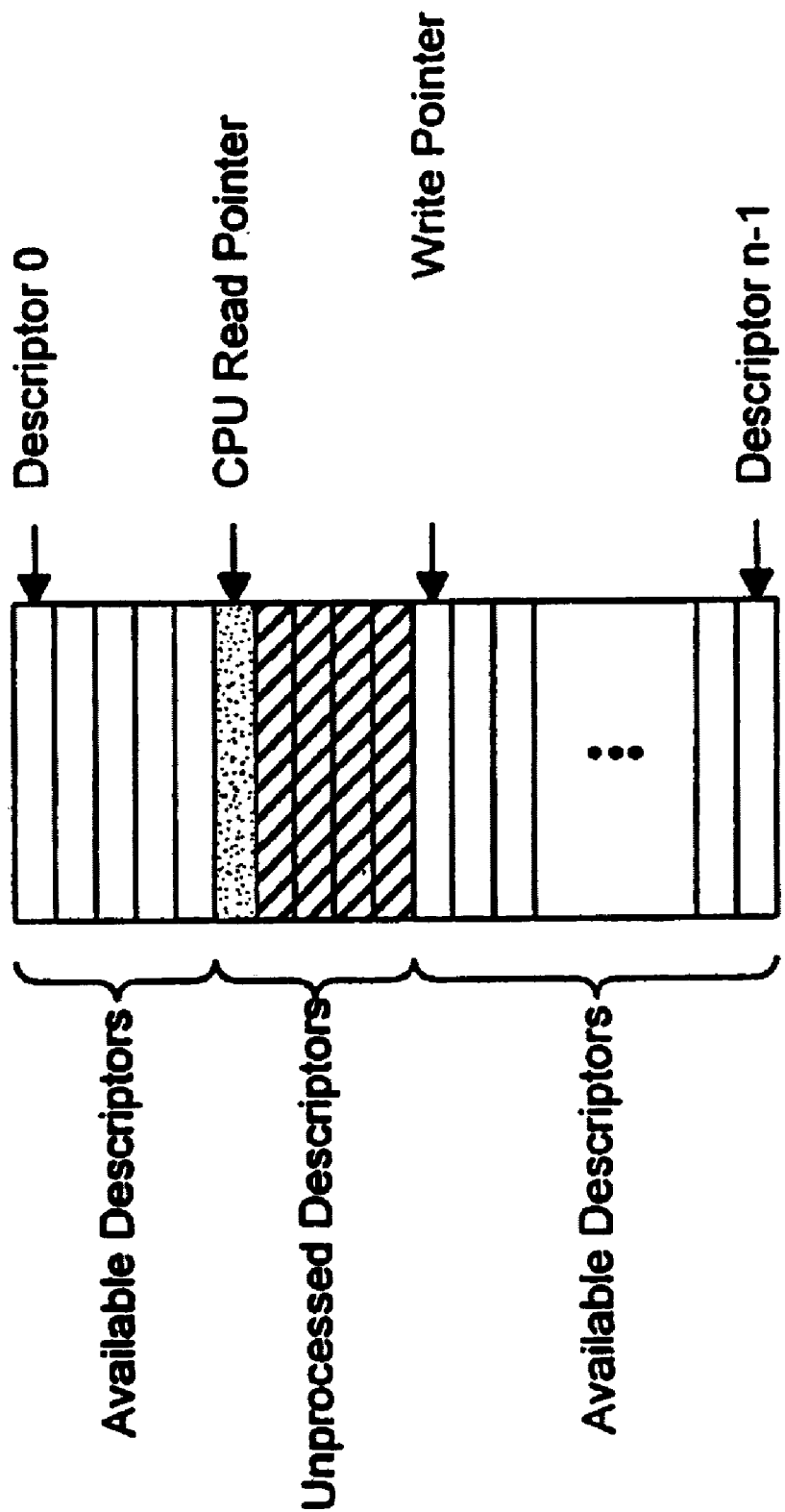
FIG. 3 is a diagram illustrating write and read pointers pointing to the corresponding descriptors in a descriptor list.

FIG. 3 illustrates the write and read pointers pointing to the corresponding descriptors in a ring including n descriptors (from 0 to n−1). The descriptors between the read pointer and the write pointer point to receive buffers that contain unprocessed received frame data. The rest of the descriptors are available descriptors pointing to buffers available for new received frame data.

When the network interface 10 finishes filling a receive buffer, it clears an OWN bit in the associated descriptor to indicate that the buffer has been filled, and increments the write pointer modulo n, where n is the number of descriptors in the ring. Thus, when the buffer associated with descriptor n−1 has been filled, the next buffer to be filled is the one associated with descriptor 0.

When the CPU 60 finishes reading data from a receive buffer, it sets the OWN bit in the associated descriptor to indicate that the buffer is available for use by the network interface 10. Also, the CPU 60 increments the read pointer modulo n.

In accordance with the present invention, when the CPU 60 releases a block of descriptors to the network interface 10, the CPU 60 writes a copy of the read pointer to the CPU read pointer register 102 in the network interface 10. Alternatively, the CPU 60 may write to this register a descriptor index number from which the network interface 10 can determine the value of the read pointer. The CPU read pointer register 102 is updated after the CPU 60 releases a block of descriptors containing a predetermined number of descriptors selected so as to avoid excessive pausing in the operation of the automatic flow control mechanism.

The network interface 10 determines the number of available receive descriptors by making the following calculation. Assume that in an descriptor ring containing n descriptors from descriptor number 0 to descriptor number n−1, the write pointer points to descriptor number W, and the read pointer points to descriptor number R. Then, if R is greater or equal to W, the number of available receive descriptors is R−W. If W is greater than R, then the number of available receive descriptors is n+R−W. The number of receive buffers available to store incoming data received from the network corresponds to the calculated number of available receive descriptors.

Automatic flow control may be enabled by setting the congestion detection enable bit in the congestion detection enable register 104. As discussed above, the network interface 10 may support two modes of the automatic flow control selected by the flow control mode bit in the flow control mode register 106. For example, when the flow control mode bit is reset to 0 and the congestion detection enable bit is set, the network interface operates in the first flow control mode. In this mode, when the network interface 10 detects a shortage of buffers for holding received data, it automatically requests the link partner to suspend data transmission until the network interface 10 detects that the required buffers are available.

In order to detect a shortage of receive buffers, the network interface 10 compares the calculated number of available receive descriptors with the low threshold value stored in the free descriptor low threshold register 110. When the network interface 10 operates in a full-duplex mode and the calculated number of available receive descriptors falls below the low threshold value, the network interface 10 sends to the network medium 50 a PAUSE frame defined in the IEEE Standard 802.3. The request_operand field of the transmitted PAUSE frame contains the value FFFFh indicating that the link partner should suspend data transmission for a very long time. When the network interface 10 detects that the calculated number of available receive descriptors rises above the high threshold value stored in the free descriptor high threshold register 108, the network interface 10 sends to the network 50 a PAUSE frame whose request operand field contains the value 0 indicating that the link partner should resume data transmission.

When the network interface 10 operates in a half-duplex mode, and the calculated number of available receive descriptors falls below the low threshold value, the network interface enables a back pressure mechanism. When this mechanism is enabled, the network interface 10 sends a short frame segment in response to any frame transmitted by a remote transmitter, to cause a collision with the remote transmitter. This collision forces the remote transmitter to postpone its transmission for a random amount of time as specified by the IEEE 802.3 protocol. When the calculated number of available receive descriptors rises above the high threshold value, the network interface 10 disables the back pressure mechanism allowing the link partner to resume data transmission.

When the flow control mode bit in the flow control mode register 106 is set to 1 and the congestion detection enable bit is set, the network interface 10 operates in the second flow control mode, in which the network interface automatically requests the link partner to suspend data transmission for a predetermined time defined by a pause value stored in the pause value register 112.

In the second flow control mode, the network interface 10 compares the calculated number of available receive descriptors with the low threshold value stored in the free descriptor low threshold register 110. When the calculated number of available receive descriptors falls below the low threshold value, the network interface 10 resets the pause timer 114, loads this timer with the preprogrammed pause value stored in the pause value register 112, and causes the timer 114 to start counting down. The timer decrements by 1 after each network slot time interval defined in the IEEE 802.3 specification.

If the network interface 10 operates in a full-duplex mode, then simultaneously with starting the pause timer 114, the network interface transmits a PAUSE frame to the link partner in the network 50. The request_operand field of this PAUSE frame contains the pause value stored in the pause value register 112 to indicate that the link partner should suspend its transmission for a time period defined by the pause value. If the network interface 10 operates in a half-duplex mode, then simultaneously with starting the pause timer 114, the network interface 10 enables the back pressure mechanism.

When the count of the pause timer 114 reaches 0, the network interface 10 again compares the calculated number of available receive descriptors with the low threshold value stored in the free descriptor low threshold register 110. If the network interface 10 operates in a full-duplex mode and the calculated number of available receive descriptors is less than the low threshold value, the network interface 10 reloads the pause timer 114 with the pause value from the pause value register 112 and sends another PAUSE frame whose request_operand field contains the pause value. However, if the calculated number of available receive descriptors is greater than or equal to the low threshold value, the network interface 10 takes no actions allowing the link partner to resume its transmission after the time period specified by the pause value.

If the network interface 10 operates in a half-duplex mode and the calculated number of available receive descriptors is less than the low threshold value, the network interface 10 reloads the pause timer 114 with the pause value from the pause value register 112. The back pressure mechanism remains enabled. However, if the calculated number of available receive descriptors is greater than or equal to the low threshold value, the network interface 10 disables the back pressure mechanism allowing the remote transmitter to resume its transmission after the time period defined by the pause timer 114.

As discussed above, the automatic flow control mechanism is enabled only when the congestion detection enable bit is set. When this bit is cleared, no PAUSE frame is sent in a full-duplex mode, and the back pressure mechanism is not enabled in a half-duplex mode.

Thus, the present invention provides an automatic flow control mechanism that supports two modes of automatic flow control. In the first flow control mode, the network interface 10 periodically compares the number of available receive descriptors with low and high threshold values. When the number of available receive descriptors falls below the low threshold value, the network interface 10 sends a PAUSE frame requesting the link partner to suspend its transmission (in a full-duplex mode), or enables the back pressure mechanism (in a half-duplex mode). When the number of available receive descriptors rises above the high threshold value, the network interface sends a PAUSE frame requesting the link partner to resume its transmission (in a full-duplex mode), or disables the back pressure (in a half-duplex mode). In the second flow control mode, when the network interface detects that the number of available receive descriptors is less than the low threshold value, it transmits a PAUSE frame requesting the link partner to suspend its transmission for a time period corresponding to a preprogrammed pause value (in a full-duplex mode), or enables the back pressure mechanism, at least, for a time interval defined by a pause timer loaded with the preprogrammed pause value (in a half-duplex mode).

Those skilled in the art will recognize that the present invention admits of a number of modifications, within the spirit and scope of the inventive concepts. For example, the automatic flow control mechanism may be implemented in a number of different ways.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A computer system comprising:
   a local bus,
   a host processor coupled to the local bus,
   a network interface for providing an interface between the local bus and a network medium, and
   a memory coupled to the local bus, the memory having receive buffers allocated for receiving data from the network medium,
   the network interface including an automatic flow control mechanism for automatically controlling a flow of data from the network medium based on availability of the receive buffers,
   wherein in a first flow control mode initiated when a flow control mode signal is at a first logic level, the automatic flow control mechanism is configured to respond to a shortage of the receive buffers by automatically requesting a remote transmitter coupled to the network medium to suspend data transmission until a predetermined number of the receive buffers is available, and
   in a second flow control mode initiated when the flow control mode signal is at a second logic level, the automatic flow control mechanism is configured to respond to a shortage of the receive buffers by automatically requesting the remote transmitter coupled to the network medium to suspend data transmission for a predetermined time.

2. The computer system of claim 1, wherein the network interface comprises a descriptor management unit for managing receive descriptors pointing to the receive buffers.

3. The computer system of claim 2, wherein the automatic flow control mechanism is configured to detect availability of the receive buffers by monitoring the number of available descriptors pointing to the receive buffers available for receiving data from the network medium.

4. The computer system of claim 3, wherein in the first flow control mode, the automatic flow control mechanism is configured to automatically request the remote transmitter to suspend data transmission when the number of available descriptors falls below a first threshold value.

5. The computer system of claim 4, wherein in the first flow control mode, the automatic flow control mechanism is configured to enable the remote transmitter to resume data transmission when the number of available descriptors rises above a second threshold value.

6. The computer system of claim 5, wherein the second threshold value is higher than the first threshold value.

7. The computer system of claim 3, wherein in the second flow control mode, the automatic flow control mechanism is configured to automatically request the remote transmitter to suspend data transmission when the number of available descriptors falls below a preprogrammed threshold value.

8. The computer system of claim 7, wherein in the second flow control mode, the automatic flow control mechanism is configured to enable the remote transmitter to resume data transmission after a preprogrammed time interval, if the number of available descriptors is not less than the preprogrammed threshold value.

9. The computer system of claim 3, wherein the network interface is configured to store information indicating a read pointer of the host processor that points to a next descriptor that should be processed by the host processor after a current receive buffer is read by the host processor.

10. A network interface device for providing an interface between a data network and a computer system, the network interface device comprising:
- a descriptor management unit for managing receive descriptors pointing to receive buffers allocated to receive data from the network medium, and
- an automatic flow control mechanism for automatically performing flow control in accordance with the number of available receive descriptors pointing to the receive buffers available for receiving data from the network medium.

11. The network interface of claim 10, wherein the receive buffers are arranged in a memory of the computer system.

12. The network interface device of claim 10, wherein the automatic flow control mechanism is configured to automatically request a remote station in the data network to suspend data transmission when the number of available descriptors falls below a first threshold value.

13. The network interface device of claim 12, wherein the automatic flow control mechanism is configured to enable the remote station to resume data transmission when the number of available descriptors rises above a second threshold value.

14. The network interface device of claim 13, wherein the second threshold value is higher than the first threshold value.

15. The network interface device of claim 10, wherein the automatic flow control mechanism is configured to automatically request a remote station in the data network to suspend data transmission when the number of available descriptors falls below a preprogrammed threshold value.

16. The computer system of claim 15, wherein the automatic flow control mechanism is configured to enable the remote station to resume data transmission after a preprogrammed time interval, if the number of available descriptors is not less than the preprogrammed threshold value.

17. A method of automatic flow control in a network interface between a data network and a computer system. the method comprising the steps of:
- monitoring the number of receive descriptors pointing to buffers in the computer system available for receiving data from the network, and
- automatically requesting a remote station in the data network to suspend data transmission when the number of receive descriptors falls below a first preprogrammed threshold level.

18. The method of claim 17, further comprising the step of enabling the remote station to resume data transmission when the number of receive descriptors rises above a second preprogrammed threshold level.

19. The method of claim 17, further comprising the step of enabling the remote station to resume data transmission after a preprogrammed time interval, if the number of receive descriptors is not less that the first preprogrammed threshold level.

* * * * *